INVENTORS G. E. KLEINEDLER
J. MRACEK
BY W. M. Kain
ATTORNEY

April 14, 1970 G. E. KLEINEDLER ET AL 3,505,726

BONDING PROCESS WHICH REDUCES WORKPIECE DISPLACEMENT AND BACKWELDING

Filed Dec. 2, 1966 3 Sheets-Sheet 3

United States Patent Office 3,505,726
Patented Apr. 14, 1970

3,505,726

BONDING PROCESS WHICH REDUCES WORKPIECE DISPLACEMENT AND BACKWELDING

Gary Evan Kleinedler, Flemington, N.J., and Jaroslav Mracek, Allentown, Pa., assignors to Western Electric Company, Incorporated, New York, N.Y., a corporation of New York Filed Dec. 2, 1966, Ser. No. 598,820
Int. Cl. B23k 21/00
U.S. Cl. 29—470.1 5 Claims

ABSTRACT OF THE DISCLOSURE

A bonding tool is moved into contact with a workpiece with a rolling motion, and, simultaneously, a sliding motion is superposed upon the rolling motion of the bonding tool to reduce the workpiece displacing forces generated by the bonding tool and to prevent backwelding of the workpiece to the bonding tool.

This invention relates to a bonding process in which the motion of a bonding tool compensates for undesirable displacing forces generated during the bonding process on a workpiece and prevents backwelding between the bonding tool and the workpiece.

In bonding a workpiece to a surface, a difficulty is encountered in maintaining the original position of the workpiece on the surface as a bonding tool is moved over the workpiece. For example, in the vibratory or thermocompression bonding of a plurality of leads to contacts, one problem is that of preserving the proper alignment of the leads during the bonding process while achieving substantially simultaneous bonding. A bonding tool having a flat bonding surface can be used to contact the leads simultaneously. Such a tool fails, however, to compensate for varying lead thickness, and, as a result, unequal bonding pressures are applied to the leads and non-uniform bonding results. When a bonding tool having a curved surface is moved across the leads with a rolling motion to provide substantially simultaneous bonding of the leads, a lateral pushing force is exerted by the tool upon each of the leads. This pushing force tends to displace the leads from their corresponding contacts, and if this force exceeds the frictional forces tending to hold the leads in place, then the leads will be displaced from the contacts.

Another problem encountered in vibratory and thermocompression bonding of a workpiece to a surface is backwelding, i.e., the tendency of the bonding tool to weld itself to a workpiece. When backwelding occurs, it is difficult to remove the bonding tool from the workpiece to which it is bonded without damaging the desired bond between the workpiece and the surface.

An object of this invention resides in a new and improved method of bonding a workpiece to a surface in which the tendency of a bonding tool to displace the workpiece from the surface is reduced.

Another object of this invention resides in providing a novel method of bonding a plurality of leads to a contact surface in which a bonding tool is moved across the leads with a rolling and sliding motion to compensate for lateral displacing forces on the leads, generated by the bonding process, and to preserve the original alignment of the leads upon the contact surface.

A further object of this invention is providing a method of bonding a workpiece to a surface in which backwelding is reduced.

With these and other objects in view, the present invention contemplates a new and improved method of bonding a workpiece to a surface. In practicing the method, a bonding tool is moved with a rolling motion across the workpiece, exerting forces necessary for bonding, and also, as a natural consequence of the rolling motion, exerting a pushing force on the workpiece in the direction of rolling. Simultaneously, a sliding motion is superposed upon the rolling motion of the bonding tool to compensate for the pushing force by exerting a frictional force upon the workpiece in the opposite direction. In this manner the resultant lateral force tending to displace the workpiece is reduced. The sliding motion of the bonding tool across the workpiece also prevents backwelding.

Other objects and advantages of the present invention will become apparent upon consideration of the following detailed description in conjunction with the accompanying drawings, wherein.

Figures 1, 2, 3:
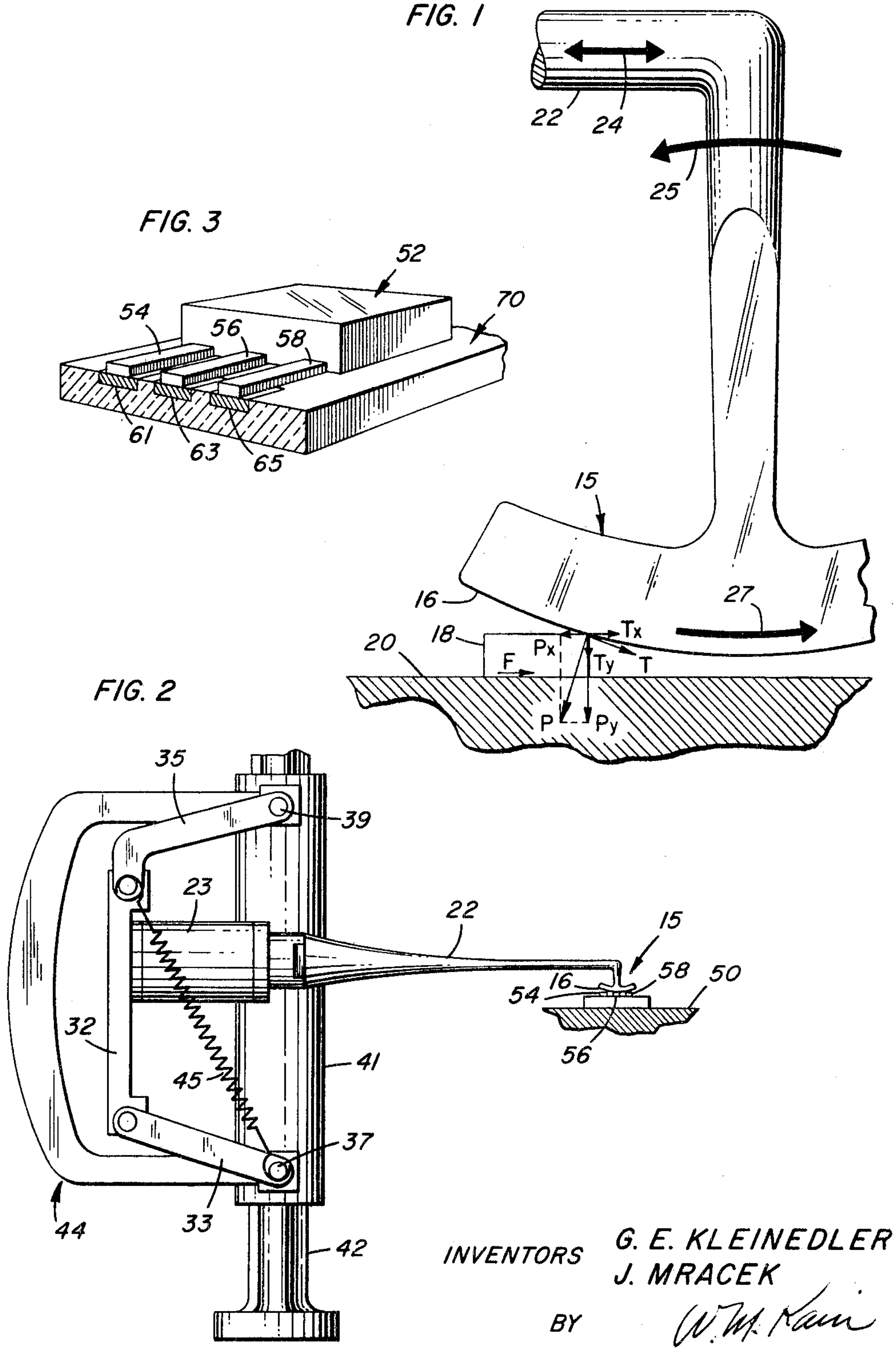
FIG. 1 is a view of a bonding tool moving with a rolling and sliding motion into contact with a workpiece to be bonded to a surface.
FIG. 2 is an illustration of a vibratory bonding apparatus, in which the bonding tool has both rolling and sliding motion, at its initial position in a bonding operation.
FIG. 3 is an illustration of a beam leaded device having a plurality of beam leads which are to be bonded to a set of contacts.

FIG. 1 illustrates a vibratory bonding tool 15 having a curved bonding surface 16 which is utilized to bond a workpiece 18 to a surface 20. The bonding tool 15 is connected to a sonotrode 22 which transmits vibrations to the bonding tool 15 from a transducer 23 (FIG. 2) as indicated by arrow 24. The sonotrode 22 also functions as a supporting member for the bonding tool 15 and is used to move the bonding tool 15 across the surface of the workpiece 18.

In the steps of the method of the present invention, the workpiece 18 is first placed in contact with the surface 20 to which it is to be bonded. Then the bonding tool 15 having a curved bonding surface 16 is moved with a rolling motion, in the direction indicated by arrow 25, into contact with the workpiece 18, as shown in FIG.. 1. At the same time, mechanical vibrations from the transducer 23 are applied to the bonding tool 15 through the sonotrode 22. When the tool 15 makes its first contact with the workpiece 18, a pushing for P having a horizontal component $P_x$ and a vertical component $P_y$ is exerted on the workpiece 18. The horizontal component $P_x$ acts as a lateral pushing force which tends to displace the workpiece 18 horizontally in the direction of rolling motion (arrow 25) of the tool 15. The vertical component $P_y$ acts as a clamping force which applies a desired bonding pressure to the workpiece 18. The horizontal component $P_x$ is opposed by a frictional force F exerted by the surface 20 on the workpiece 18. If the lateral pushing force $P_x$ exceeds the frictional force F, the workpiece 18 will be displaced from the area to which it is to be bonded.

In order to compensate for the lateral pushing force $P_x$, a sliding motion in the direction indicated by arrow 27 is superposed on the rolling motion of the bonding tool 15. This sliding motion produces a slipping of the curved surface 16 relative to the workpiece 18. This slipping motion produces a frictional force T on the workpiece 18, having a horizontal component $T_x$ and a vertical component $T_y$. The horizontal component $T_x$ compensates for the lateral pushing force $P_x$ generated by the rolling motion of the bonding tool 15. Since the frictional force $T_x$ acts in the direction of the frictional force F, opposing the pushing force $P_x$, the tendency of the workpiece 18 to be displaced upon first contact with the bonding tool 15 is reduced. The vertical component Ty, which should be relatively small, serves as an additional clamping force on the workpiece 18.

The bonding of the workpiece 18 to the surface 20 is initiated upon first contact of the vibrating bonding tool 15 with the workpiece 18. At this point the workpiece 18 is partially bonded to the surface 20, furnishing additional resistance to the displacing forces exerted upon the workpiece 18. As the bonding tool 15 is moved over the surface of the workpiece 18 with a continuous rolling and sliding motion, the bonding process continues until the workpiece 18 has been completely bonded to the surface 20.

As mentioned above, backwelding is a problem which is encountered in conventional vibratory and thermocompression bonding methods. In both types of bonding, a workpiece is bonded to a surface by applying pressure and energy to the workpiece through a bonding tool. backwelding of the tool to the workpiece occurs because the pressure and energy applied to the tool-workpiece interface are substantially the same as those applied to the workpiece-surface interface. It has been discovered that backwelding can be reduced by moving the bonding tool across the workpiece during a bonding operation. In the bonding method of the present invention, the sliding motion of the bonding tool 15 relative to the workpiece 18 substantially reduces or prevents backwelding between the bonding surface 16 and the workpiece 18. Thus, at the conclusion of the bonding process the bonding tool 15 can be removed from the workpiece 18 without damaging the bond between the workpiece 18 and the surface 20.

It should be noted that the sliding motion of the bonding tool 15 serves two functions. First, it exerts a lateral frictional force T$x$ on the workpiece 18 which opposes a pushing force P$x$ generated by the rolling motion of the bonding tool 15. These two forces tend to cancel one another and thereby reduce the resultant force exerted on the workpiece 18 in the lateral direction. Second, the sliding motion of the bonding tool 15 produces a slipping motion between the curved surface 16 of the bonding tool 15 and the workpiece 18 which prevents the backwelding between the workpiece 18 and the bonding tool 15.

FIG. 2 illustrates a vibratory bonding apparatus which may be operated to obtain the desired rolling and sliding motion of the bonding tool 15. The bonding tool 15 of FIG. 1 is mounted upon the sonotrode 22 which transmits vibrations from the transducer 23 to the bonding tool 15. The sonotrode 22 is mounted upon a vertical linking bar 32 so that the center of the bonding surface 16 is on a perpendicular raised from the midpoint of the vertical linking bar. The ends of the vertical linking bar are pivotally connected to horizontal linking bars 33 and 35. The horizontal bars 33 and 35 are pivotally connected to fixed pivot points 37 and 39 on a sleeve 41. The sleeve 41 is slidably mounted on a fixed vertical post 42. A handle 44 is connected to the sleeve 41 for manual operation of the bonding apparatus. A tension spring 45 is connected between the fixed pivot point 37 and a pivot pin connecting the bars 32 and 35. An anvil 50 is positioned beneath the bonding tool 15 for supporting a workpiece.

The arrangement of the three linking bars 32, 33 and 35 is known in the prior art as a "Roberts linkage." This arrangement has been used to provide for perpendicular motion of a tool relative to a workpiece. In the present invention, it is operated in a special manner to provide a rolling and sliding motion of the vibratory bonding tool 15 across the surface of a workpiece.

The apparatus of FIG. 2 can be used to bond a plurality of workpieces to a surface, for example, bonding a plurality of leads of a beam leaded device to a conducting surface. FIG. 3 illustrates a beam leaded device

52 having three beam leads 54, 56 and 58 which are to be bonded to three conducting areas 61, 63 and 65 on a substrate 70.

Figures 4, 5, 6, 7, 8:
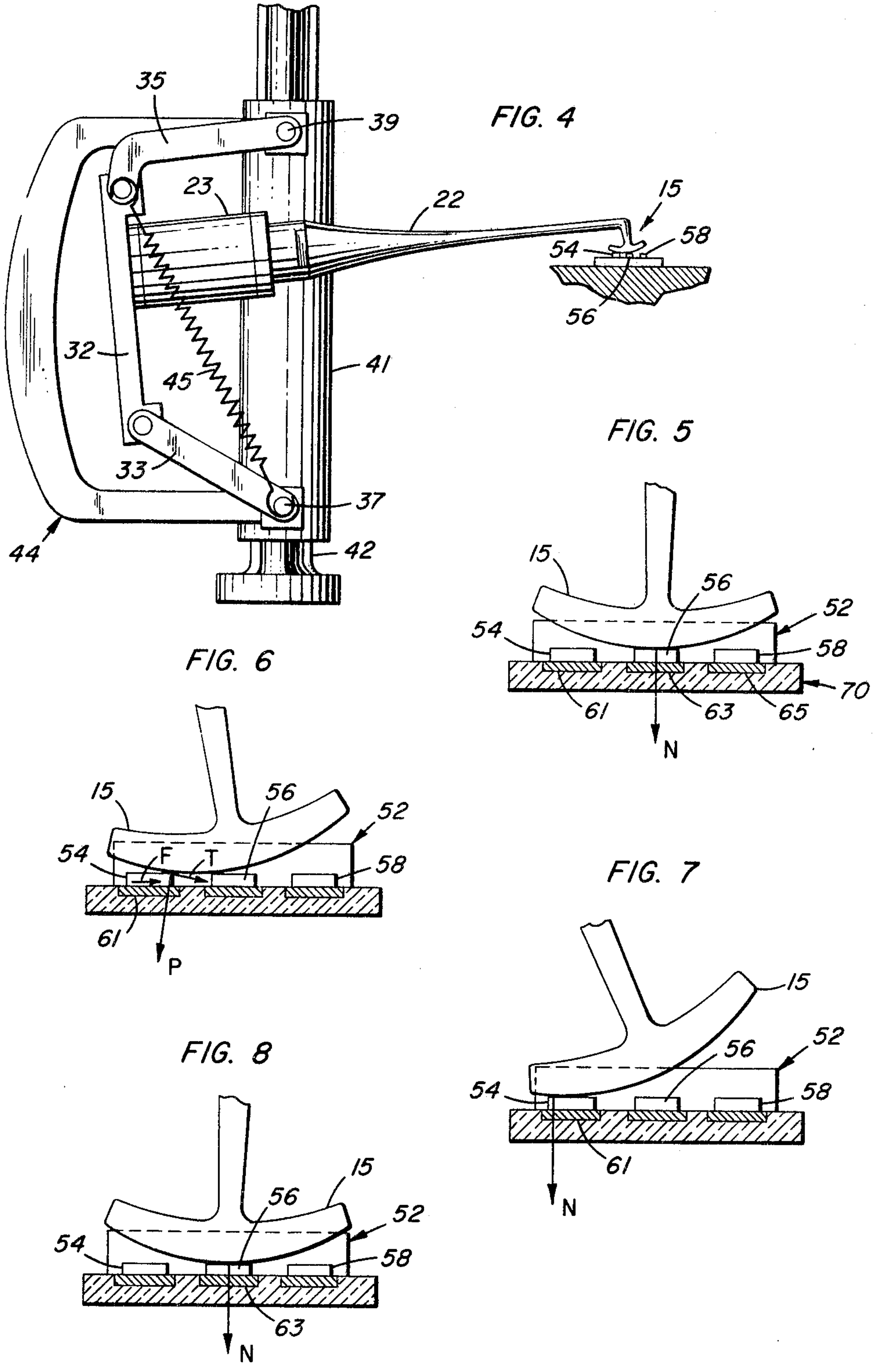
FIG. 4 illustrates the operation of the bonding apparatus in bonding a plurality of leads to a set of contacts.
FIGS. 5–12 illustrate the bonding tool on an enlarged scale in various positions during the operation of the bonding apparatus.

In the bonding process the beam leaded device 52 is positioned beneath the bonding tool 15 upon the substrate 70 with the leads 54, 56 and 58 in alignment with the conducting areas 61, 63 and 65 as shown in FIGS. 3 and 5. Then the bonding apparatus is moved vertically downward along the post 42, with the sonotrode 22 temporarily held in a horizontal position against the bias of the spring 45, until the midpoint of the curved bonding surface 16 contacts the center lead 56 (FIG. 2). FIG. 5 illustrates the bonding tool 15 of FIG. 2 on an enlarged scale as it makes its first contact with the center lead 56. At this point the only force exerted by the bonding tool 15 on the lead 56 is a normal force N which tends to maintain the lead 56 in contact with the conducting area 63 and provides a desirable bonding pressure. Mechanical vibrations are applied to the bonding tool 15 which partially bond the lead 56 to the conducting area 63.

As the downward motion of the sleeve 41 over the post 42 is continued, the bonding tool 15 is moved across the lead 56. Since the lead 56 has been partially bonded to the conducting area 63, any lateral forces exerted by the bonding tool 15 as it moves across the lead 56 are resisted by the bond between the lead 56 and the conducting area 63. Thus, the center lead 56 remains in contact with the area 63 while the bonding process is completed.

As mentioned earlier in the specification, the "Roberts linkage" is normally used to provide for perpendicular motion of a tool relative to a workpiece. In the present invention, however, this linkage is used in a special manner to produce the desired rolling and sliding motion of the bonding tool 15. The position of the bonding tool 15 relative to the linkage is chosen such that the midpoint of the bonding surface 16 coincides with "Ball's point" of the linkage. This point moves on a straight line parallel to the sleeve 41 when the linking bars 32, 33 and 35 are rotated about their pivot points.

As the sleeve 41 is moved along the post 42, the bonding tool 15 tends to move with a rolling motion. But the motion of surface 16 is not purely rolling since one point on its periphery, the midpoint of the bonding surface 16, is limited to movement along a straight line in the vertical direction. If this motion were a pure rolling motion, then the midpoint and all other points on the bonding surface 16 would move with cycloidal motion. Because the midpoint is limited to vertical motion, however, all other points along the bonding surface 16 are forced to move with a sliding motion over the workpiece as the midpoint is displaced along a vertical line. The sliding motion is greater for points on the bonding surface 16 which are farther away from the midpoint. When the sleeve 41 is moving downward over the post 42, the sliding motion of the bonding tool 15 is to the right over the workpiece; and when the sleeve 41 is moving upward, the sliding motion is to the left.

In the operation of the bonding apparatus of FIG. 2, after the midpoint of the bonding surface 16 has been moved into contact with the lead 56, further downward movement of the sleeve 41 along the post 42 rotates the linkage about its pivot points and tends to move the bonding tool 15 across the lead 56 to the left with a rolling and sliding motion. The sliding motion of the bonding tool 15 prevents backwelding of the tool 15 to the lead 56.

As the sleeve 41 continues to slide downward over the post 42, the bonding tool 15 makes its first contact with the adjacent lead 54, as shown in FIG. 4. At this point, shown on an enlarged scale in FIG. 6, a pushing force P is exerted on the lead 54 having a horizontal component P$x$ (FIG. 1) which tends to displace it from its conducting area 61 and a vertical component P$y$ (FIG. 1) which applies a desired bonding pressure to the lead 54. Simultaneously, a frictional force T is exerted on the lead 54 by the slipping motion of the curved bonding surface 16 relative to the lead 54. The horizontal component $Tx$ (FIG. 1) of the force T opposes the pushing force $Px$. The vertical $Ty$ (FIG. 1) applies an additional bonding pressure to the lead 54. In addition to the frictional force $Tx$, an additional frictional force F exerted by the conducting area 61 on the lead 54 acts in opposition to the pushing force $Px$. It should be noted that if the component $Px$ of the pushing force P does not exceed the sum of the lateral frictional forces $Tx$ and F, then the lead 54 will remain in alignment with its corresponding conducting area 61 during the bonding process.

The rolling and sliding motion of the bonding tool 15 across the lead 54 is continued until the bonding between the lead 54 and the conducting area 61 is completed. Again, the sliding motion of the curved bonding surface 16 over the lead 54 prevents backwelding. After the bonding of the lead 54 is completed, the tool 15 is in the position shown in FIG. 7, exerting a normal force N on the lead 54.

Next, the bonding tool 15 is moved back across the lead 54 by raising the sleeve 41 along the post 42, until the bonding tool 15 is in its original position, as shown in FIG. 8. It should be noted that the sliding motion of the bonding tool 15 across the leads 54 and 56 as it returns to its original position on the lead 56 is to the 42. But, since bonding has already occurred, the lateral displacing forces on the leads 54 and 56 are resisted by the bonds between the leads 54 and 56 and their corresponding conducting areas 61 and 63. Again, the sliding motion of the bonding tool 15 prevents backwelding.

Figure 9:
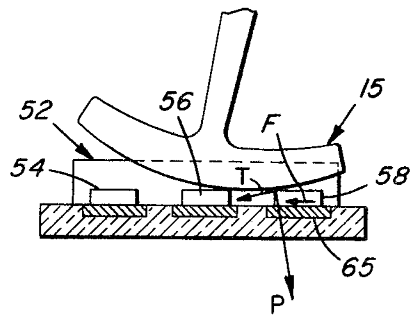
Figure 10:
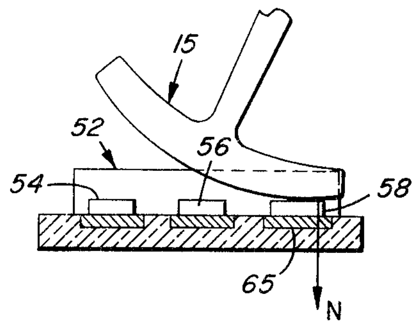
Figure 11:
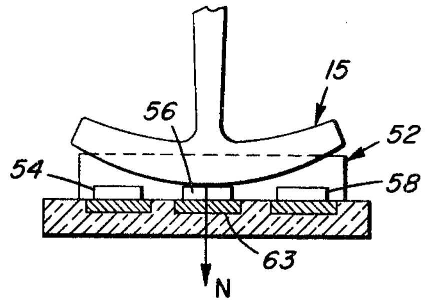

The bonding of the center lead 56 and the lead 58 is completed by raising the sleeve 41 on the post 42 which produces a rolling and sliding motion of the bonding tool 15 in the opposite direction, as shown in FIG. 9. In FIG. 10 the bonding tool 15 is shown after it has moved completely across the lead 58. It should be noted that the motion of the bonding tool 15 relative to the lead 58 is exactly the same motion which is used in bonding the lead 54. Then the sleeve 41 is lowered to its original position where the bonding tool 15 is again in contact with the center lead 56, as shown in FIG. 11.

Figure 12:
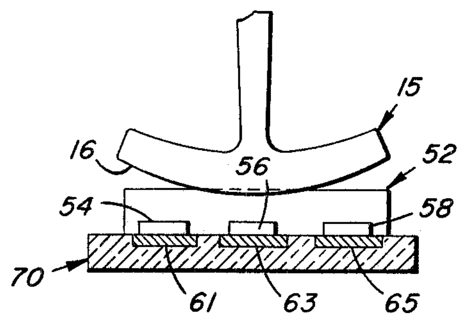

Finally, the bonding apparatus is moved vertically upward along the post 42 with the sonotrode 22 held in a horizontal position so that the bonding tool 15 is removed from the center lead 56, as illustrated in FIG. 12, leaving the leads 54, 56 and 58 bonded to the conducting areas 61, 63 and 65.

When it is desired to bond a plurality of leads to a set of contacts, the method of the present invention can be used to perform the bonding with a minimum of displacing forces on the leads. After the leads are positioned in alignment with the corresponding contacts, the bonding tool 15 is lowered into contact with a selected lead preferably at or near the center of the group of leads. Vibrations are applied to the bonding tool 15 to partially weld the first lead to its corresponding contact. Then the bonding tool 15 is moved with a rolling and sliding motion in one direction from the first lead across the adjacent leads until the outermost lead in that direction has been bonded. Next, the bonding tool 15 is moved back to its original position on the first selected lead and then moved in the opposite direction from the first lead to complete its bonding. The motion of the bonding tool 15 across the remaining leads is continued until the outermost lead in the opposite direction has been bonded.
left since the sleeve 41 is moving upward along the post
Finally, the bonding tool 15 is returned to its original position and then raised out of contact with the first selected lead.

One important application of the present invention is in the fabrication of miniature electronic circuits having beam leaded devices as components. The beam leads of a typical beam leaded device may be on the order of 9 mils in length, 4 mils in width and ½ mil in thickness, and the spacing between adjacent leads may be approximately 7 mils. In bonding such small leads to contacts on a circuit board, it is difficult to maintain the desired alignment of the leads with respect to the contacts. Since the leads have such small dimensions, they are easily displaced from the contacts by lateral forces generated during the bonding process. By moving a bonding tool having a curved bonding surface over the leads with both a rolling and sliding motion, the resultant lateral forces exerted on the leads by the bonding tool are reduced and the proper alignment of leads and contacts is maintained. The use of a bonding tool with a curved bonding surface eliminates the difficulties encountered in simultaneous bonding where the leads have varying thickness, and permits substantially simultaneous and uniform bonding of the leads. By superposing a sliding motion upon the rolling motion of the bonding tool, the tendency of the tool to weld itself to the leads is reduced and the problem of backwelding is eliminated.

As illustrated in FIGS. 1, 2–12, vibrations are introduced into bonding tool 15 by sonotrode 22 vibrating in the longitudinal mode (arrow 24, FIG. 1). Satisfactory bonds may be made in accordance with the principles of this invention with apparatus which introduces vibration into the bonding tool in other modes known to those skilled in the vibratory bonding art.

Although the method described above utilized vibratory energy to perform the desired bonding, the present invention is not limited to vibratory bonding processes. For example, the method of this invention can be used in thermo-compression bonding where the problems of reducing displacing forces and preventing backwelding also occur. When practicing this invention in thermocompresssion bonding apparatus such as that illustrated in FIG. 2 may be modified by replacing transducer 23 and sontrode 22 with a simple beam support. Bonding tool 15 and/or anvil 50 may be provided with suitable heating means, for example a resistance heater(s). Tension spring 45 may be selected to apply suitable pressure through bonding tool 15 to the workpieces.

The bonding process described above is simply illustrative of the method of this invention and modifications in the steps of the process may be made by persons skilled in the art without departing from the scope of the invention. The bonding apparatus utilizing the "Roberts linkage" to produce the rolling and sliding motion of the bonding tool is merely an example of one system which may be utilized to achieve the desired motion. Furthermore, modifications in the disclosed apparatus may be made by persons skilled in the art without departing from the scope of the present invention.

What is claimed is:

1. A method of compensating for the lateral displacing force exerted on a workpiece by a bonding tool as said bonding tool moves over said workpiece, said method comprising:

moving said bonding tool into contact with said workpiece with a rolling motion, thereby exerting a lateral displacing force upon said workpiece in the direction of said rolling motion; and superposing a sliding motion upon said rolling motion of said bonding tool to exert a frictional force on said workpiece opposing said lateral displacing force.

2. A method of bonding a workpiece to a surface wherein the lateral force on said workpiece generated by the bonding process is reduced, said method comprising:

positioning said workpiece on said surface;

moving a bonding tool into contact with said workpiece with a rolling motion, thereby exerting a lateral pushing force and a normal clamping force on said workpiece;

applying energy through said bonding tool to bond said workpiece to said surface; and superposing a sliding motion upon said rolling motion of said bonding tool to produce a slipping of said bonding tool relative to said workpiece and exert a lateral frictional force on said workpiece opposing said lateral pushing force.

3. A method of bonding a plurality of workpieces to a surface wherein the lateral forces on said workpieces, generated by the bonding process, tending to displace said workpieces from said surface are reduced, said method comprising:

positioning said workpieces upon said surface;

moving a bonding tool having a curved bonding surface into contact with a first workpiece thereby exerting a clamping force on said workpiece;

applying vibrations to said bonding tool to initiate bonding between said first workpiece and said surface;

moving said bonding tool with a rolling and sliding motion across said first workpiece to complete the bonding of said first workpiece to said surface and to prevent back-welding of said workpiece to said bonding tool; and moving said bonding tool with a rolling and sliding motion into contact with each of the remaining workpieces, said rolling motion exerting clamping forces on said workpieces exerting lateral pushing forces on said workpieces tending to displace said workpieces in the direction of rolling, and said sliding motion exerting frictional forces on said workpieces to reduce the lateral pushing forces tending to displace said workpieces.

4. A method of bonding a plurality of leads to contacts wherein the lateral forces on said leads tending to displace said leads from said contacts, generated by the bonding process, are reduced, said method comprising:

positioning said leads upon said contacts;

moving a bonding tool having a curved bonding surface into contact with a first lead;

applying mechanical vibrations to said bonding tool to bond said first lead to its corresponding contact;

moving said bonding tool across the adjacent leads with a rolling motion, thereby exerting lateral forces on said leads tending to displace said leads from said contacts; and superposing a sliding motion upon said rolling motion of said bonding tool, exerting frictional forces upon said leads to compensate for said lateral forces.

5. A method of bonding a plurality of beam leads of a beam leaded device to conducting areas of a surface wherein the lateral forces, generated by the bonding process, tending to displace said leads from said conducting areas are reduced and backwelding is prevented, said method comprising:

positioning said beam leaded device on said surface so that said beam leads and conducting areas are in contact;

moving a bonding tool having a curved bonding surface into contact with a first beam lead thereby exerting a clamping force on said lead;

applying mechanical vibrations to said bonding tool to initiate bonding between said first beam lead and its corresponding conducting area;

moving said bonding tool with a rolling and sliding motion across said first beam lead to complete the bonding of said first beam lead to its conducting area, said sliding motion preventing backwelding of said first beam lead to said bonding tool; and moving said bonding tool with a continuous rolling and sliding motion from said first beam lead into contact with the adjacent beam leads thereby exerting clamping forces on said beam leads, said rolling motion exerting lateral pushing forces on said beam leads tending to displace said beam leads from said conducting areas in the direction of rolling, and said sliding motion superposed upon said rolling motion in a direction to exert lateral frictional forces on said beam leads opposing said lateral pushing forces and to prevent backwelding.

References Cited

UNITED STATES PATENTS

| | | | |
|---|---|---|---|
| 3,340,347 | 9/1967 | Spiegler | 29—627 |
| 2,985,954 | 5/1961 | Jones et al. | 29—497.5 |
| 3,125,803 | 3/1964 | Rich | 29—589 |
| 3,125,906 | 3/1964 | Johnson | 29—589 |
| 3,217,957 | 11/1965 | Jarvie et al. | 29—470.1 |
| 3,292,838 | 12/1966 | Farley | 29—470.1 |
| 3,376,179 | 4/1968 | Balamuth | 29—470.3 |

JOHN F. CAMPBELL, Primary Examiner

R. B. LAZARUS, Assistant Examiner

U.S. Cl. X.R.

29—497.5

L-566-PT
(6-69)

UNITED STATES PATENT OFFICE
CERTIFICATE OF CORRECTION

Patent No. 3,505,726 Dated April 14, 1970

Inventor(s) Gary Evan Kleinedler and Jaroslav Mracek

It is certified that error appears in the above-identified patent and that said Letters Patent are hereby corrected as shown below:

Column 2, line 44, "FIG.. 1." should have been --FIG. 1.--;

line 48, "for" should have been --force--.;

Column 3, line 20, "backwelding" should have been --Backwelding--.

Column 5, line 4, "vertical Ty" should have been --vertical component Ty--;

lines 27-28, "is to the 42." should have been --is to the left since the sleeve 41 is moving upward along the post 42.--;

line 69, "left since the sleeve 41 is moving upward along the post" should be deleted.

Column 6, lines 35-36, "thermocompresssion" should have been --thermocompression--;

line 37, "sontrode" should have been --sonotrode--.

SIGNED AND SEALED
AUG 18 1970

(SEAL)
Attest:

Edward M. Fletcher, Jr.
Attesting Officer

WILLIAM E. SCHUYLER, JR.
Commissioner of Patents